Aug. 8, 1967  E. FISCHER  3,334,531
CENTER MECHANISM FOR MACHINE TOOLS
Filed Dec. 6, 1965
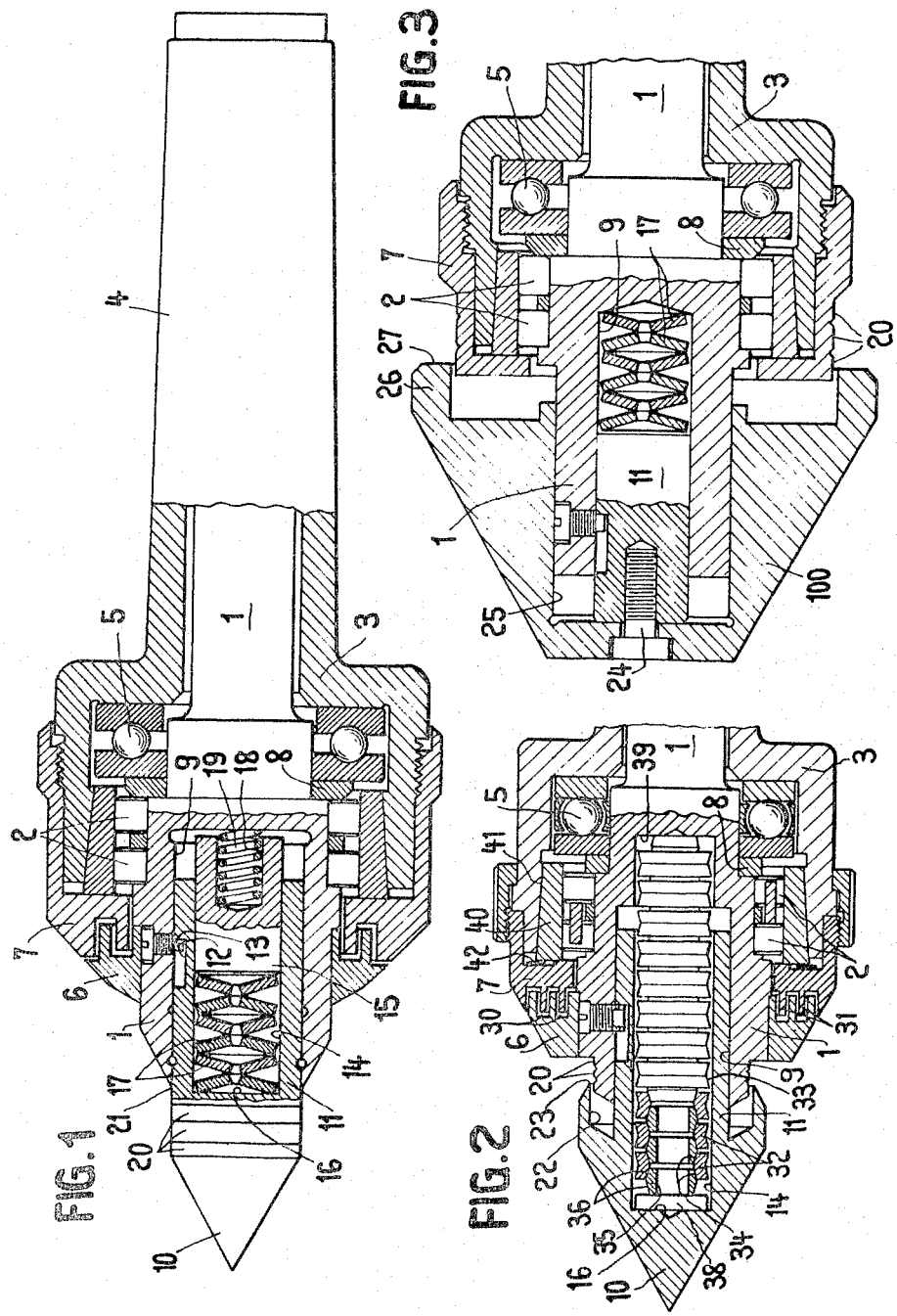
INVENTOR
Ernst Fischer
BY
*Munn & Smiley*
ATTORNEYS United States Patent Office 3,334,531
Patented Aug. 8, 1967

3,334,531
CENTER MECHANISM FOR MACHINE TOOLS
Ernst Fischer, Bernstrasse 53, Herzogenbuchsee,
Switzerland
Filed Dec. 6, 1965, Ser. No. 511,806
Claims priority, application Switzerland, Dec. 23, 1964,
16,602/64
10 Claims. (Cl. 82—33)

This invention relates to a center mechanism for machine tools, particularly for lathes, including a rotatable shaft and safety means for absorbing axial thrust, this mechanism being adapted for being inserted into the tailstock of a lathe or other machine.

In prior center mechanisms of this kind the center is formed at the one end of the shaft, these parts being made in one piece, and the said safety means, such as two or more cup springs, are disposed between an axial anti-friction bearing taking up the axial thrust of the shaft and a ring supported on a shoulder of the shaft. This prior mechanism has a number of drawbacks. The axial length of the mechanism is increased by the said arrangement of the cup springs. On the other hand it is desirable to increase the number of cup springs in order to obtain a sensitive safety device. However, by increasing the number of cup springs the axial length of the mechanism is increased accordingly and the loading capacity decreases with increasing number of cup springs. For these reasons two cup springs are usually disposed in prior devices for keeping the axial length within reasonable limits in spite of the low sensitivity of the safety means. Prior center mechanism have another disadvantage because the whole shaft has to be removed for repair when a cup spring is broken or when the center has to be replaced.

It is a primary object of this invention to remove the above drawbacks of prior center mechanisms and to obtain further advantages. The mechanism according to this invention broadly comprises a rotatable shaft, a part mounted in said shaft for rotation together with the shaft and for axial displacement relatively to the shaft, a center supported by said part and safety means adapted to absorb axial thrust and accommodated between said part and said shaft.

Due to this arrangement, no axial displacement of the shaft is required and therefore simple and efficient high-precision bearing means may be used for the shaft. Defects of the center or of the safety means may be repaired without removing the shaft from the machine casing. Since it is possible to partially or wholly accommodate the safety device in a cavity of the part supporting the center, a high number of cup springs and/or a relatively long helical spring may be used for obtaining high sensitivity without unduly increasing the axial length of the mechanism. Under these circumstances the axial displacement of the center relatively to the axially stationary parts of the mechanism and of the machine may have a considerable stroke, and this stroke may directly be indicated for giving an indication of the axial thrust acting onto the safety means. As an example two or more annular reference surfaces having different colours, annular grooves or the like cooperating with an index may be provided on the shaft, on the part supporting the center or on a stationary position of the machine.

The attached drawing shows, by way of example, three embodiments of the invention.

FIG. 1 is an elevation of the first embodiment, partially in axial section,

FIG. 2 is an axial section of the important portion of a second embodiment and

FIG. 3 is an axial section of the important portion of a third embodiment.

In the embodiment shown in FIG. 1 the shaft 1 which is not axially displaceable is rotatably mounted in the casing 3 including the fixing cone 4 by means of roller bearings 2. The axial thrust acting onto the shaft 1 is transmitted through an axial ball bearing 5 to the casing. The roller bearings 2 are axially secured in the casing by means of a sleeve 7 screw-fixed on casing 3 and forming a labyrinth seal with a sealing ring 6 fixed on shaft 1.

The outer wider end of shaft 1 has a bore 9 wherein a hollow part or sleeve 11 carrying the center 10 is mounted for axial displacement between end positions determined by the inner end of a screw 13 engaging a slot 12, whereby relative rotation between the part 11 and shaft 1 is also prevented. A cylinder 15 is axially displaceable in a bore 14 of part 11. A number of cup springs, for instance six springs 17 as shown in FIG. 1 are disposed between the cylinder 15 and the bottom 16 of bore 14. Since the cup springs are accommodated in the bore of part 11 they do not increase the axial length of the mechanism. If the cup springs were disposed between the bearing 5 and the ring 8 as is usual in prior devices of this kind, the axial length of the mechanism would be increased and its stability reduced. The cylinder 15 has a bore 18 receiving a helical spring 19 for absorbing relatively small axial thrust when small pieces are worked on the lathe and allowing indication of such small thrusts.

Due to the relatively high number of cup springs 17 and the relatively great length of the helical springs 19 the axial stroke of the center 10 and of part 11 under the thrust acting onto the center is relatively important and may thus be used for indication of the thrust. For this purpose annular surfaces 20 of different colours, for instance yellow, red and green surfaces are provided on the cylindrical outer end of part 11, these annular surfaces serving as an index or scale together with the edge 21 of shaft 1 for indicating the depth to which the center 10 and part 11 are pressed into the shaft 1 by the axial thrust, whereby the value of the axial thrust is indicated. The surfaces 20 and the edge 21 may easily be observed during the operation of the machine even when the center and shaft 1 are rotating.

In a modified mechanism only cup springs 17 or only a helical spring 19 may be provided.

In the embodiment shown in FIG. 2 corresponding parts are designated by the same reference numerals as in FIG. 1 and such parts will not be explained in detail. The outer end of shaft 1 engages a ring groove 22 of part 11 for preventing entry of contaminations. The edge 23 of part 11 serves as an index or reference mark for indication of the depth to which the center 10 and part 11 are pressed into the shaft 1 under the axial thrust acting onto the center, the axial position of the center 10 and part 11 being indicated by means of annular rings 20 of different colours provide on the shaft 1. The embodiment of FIG. 2 further differs from the one shown in FIG. 1 by a double labyrinth seal formed by annular grooves 30 and annular ribs 31. Instead of cup springs a system of interengaging outer elastically extensible rings 32 having each an outer conical groove 33 and two conical inner surfaces 34 engaging conical outer surfaces 36 of inner rings 35 is provided. Eleven rings 32 and twelve rings 35 are shown in FIG. 2, but it is obvious that more or less rings may be provided. The system of rings is supported at one end by means of a disc 38 at the bottom of bore 14 of part 11, and the other end of the system of rings engages the bottom 39 of the bore 9 of shaft 1. By axial thrust acting onto the center 10 the rings 35 are pressed into the rings 32 and the latter are thereby elastically expanded and the axial length of the system of rings is reduced so that the part 11 is pressed into the bore of shaft 1. For automatically adjusting the clearance of the roller bearings 2 a cup spring 42 acts onto the outer bearing race 40 having a conical outer surface 41, the cup spring 42 being inserted between the one face of the outer race 40 and on the sleeve 7.

The embodiment shown in FIG. 3 differs from the one shown in FIG. 1 by the exclusive use of cup springs 17 without helical spring, by a short part 11 without bore and by a large center 100 fixed to the outer face of part 11 by means of a screw 24. The shaft 1 engages a bore 25 of the center 100 and an axial annular collar 26 of the center encloses the sleeve 7. The edge surface 27 of the collar 26 serves as an index which is axially displaceable along annular surfaces 20 of different colours provided on the sleeve 7 for indication of the axial displacement of the center and thus of the axial thrust acting thereon.

A double labyrinth seal as shown in FIG. 2 may also be provided in the embodiments of FIGS. 1 and 3, whereby grooves 30 and ribs 31 may be provided on opposite faces of the sleeve 7 and of the center 100 in FIG. 3.

What I claim is:

1. A center mechanism for machine tools, particularly for lathes, comprising a housing having a tapered shank, a shaft rotatably mounted in said housing, a part mounted in said shaft for rotation together with the shaft and for axial displacement relatively to the shaft, a center supported by said part and safety means adapted to absorb axial thrust and accommodated between said part and said shaft.

2. A center mechanism according to claim 1, comprising means for indicating the axial thrust acting onto the center.

3. A center mechanism according to claim 2, said means for indicating the axial thrust comprising an index and a number of annular surfaces of different colour.

4. A center mechanism according to claim 1, wherein said safety means are accommodated at least in part inside a cavity of said part supporting the center.

5. A center mechanism according to claim 1, comprising cup springs and a helical spring separated from said cup springs by a cylinder, said cup springs and said helical spring being adapted to absorb the axial thrust.

6. A center mechanism according to claim 1, wherein said safety means comprise one or more helical springs.

7. A center mechanism according to claim 1, wherein said safety means comprise at least one elastically expansible ring and rings engaged into the opening thereof.

8. A center mechanism according to claim 3, wherein an outer end of said shaft is provided with the annular surfaces of different colours, said part supporting the center enclosing said outer end of the shaft and constituting said index.

9. A center mechanism according to claim 3, wherein a portion of said housing is provided with said annular surfaces of different colour, said center having a portion constituting said index and enclosing said housing portion.

10. A center mechanism according to claim 1, comprising a double labyrinth seal between said housing and said part rotatable with said shaft and center respectively.

References Cited

UNITED STATES PATENTS

| | | | |
|---|---|---|---|
| 1,689,709 | 10/1928 | Ashton | 82—31 |
| 2,426,566 | 8/1947 | Reinsch | 82—33 |
| 2,671,370 | 3/1954 | Wiest et al. | 82—33 |
| 3,191,469 | 6/1965 | Wozar | 82—33 |

WILLIAM W. DYER, JR., *Primary Examiner.*

LEONIDAS VLACHOS, *Examiner.*